(12) United States Patent
Barros et al.

(10) Patent No.: US 10,652,454 B2
(45) Date of Patent: May 12, 2020

(54) IMAGE QUALITY EVALUATION

(71) Applicant: INTERNATIONAL BUSINESS MACHINES CORPORATION, Armonk, NY (US)

(72) Inventors: Ruberth Andre Amaral Barros, Rio de Janeiro (BR); Paul Borrel, Rio de Janeiro (BR); Alvaro Bueno Buoro, Rio de Janeiro (BR)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/636,786

(22) Filed: Jun. 29, 2017

(65) Prior Publication Data
US 2019/0005315 A1 Jan. 3, 2019

(51) Int. Cl.
 *H04N 5/232* (2006.01)
 *H04N 5/225* (2006.01)
 *G06K 9/00* (2006.01)

(52) U.S. Cl.
 CPC ..... *H04N 5/23219* (2013.01); *G06K 9/00302* (2013.01); *H04N 5/2258* (2013.01)

(58) Field of Classification Search
None
See application file for complete search history.

(56) References Cited

U.S. PATENT DOCUMENTS

| 2003/0128389 | A1* | 7/2003 | Matraszek | G06F 17/30265 358/1.18 |
| 2007/0033050 | A1* | 2/2007 | Asano | G06F 17/30026 704/270 |
| 2014/0153900 | A1* | 6/2014 | Tanaka | G11B 27/034 386/239 |
| 2015/0178915 | A1* | 6/2015 | Chatterjee | G06K 9/20 382/128 |

OTHER PUBLICATIONS

David Matsumoto and Paul Ekman, "Facial Expression Analysis". (2008), Scholarpedia, 3(5):4237.
Imotions Biometric Research Platform, "Facial Expression Analysis: The Complete Pocket Guide" published Feb. 19, 2016; [online at the internet:<URL: https://imotions.com/blog/facial-expression-analysis]; [Last Visited Jun. 20, 2017].

(Continued)

*Primary Examiner* — Justin P. Misleh
(74) *Attorney, Agent, or Firm* — F. Chau & Associates, LLC

(57) ABSTRACT

A method of evaluating image quality includes capturing a first digital image of a target object using a first digital camera of a smart device. A second digital image of a user of the smart device is captured using a second digital camera of the smart device. The second digital image includes an image of the user's facial expression. A quality index is generated for the first digital image by analyzing one or more features of the second digital image. Analyzing the second digital image includes determining the user's sentiment. The quality index is then associated with the first digital image.

15 Claims, 5 Drawing Sheets

(56) References Cited

OTHER PUBLICATIONS

Noldus.com, "Facial Expression Analysis"; [online at the internet:<URL: http://www.noldus.com/facereader/facial-expression-analysis]; [Last Visited Jun. 20, 2017].
Tian, Ying-Li, Takeo Kanade, and Jeffrey F. Cohn, "Facial expression analysis," Handbook of face recognition. Springer New York, 2005. 247-275.
Microsoft, "Emotion API Previews"; [online at the internet:<URL: https://azure.microsoft.com/en-us/services/cognitive-services/emotion/]; [Visited Jun. 20, 2017].
Affectiva, "Affectiva's Emotion AI Humanizes How People and Technology Interact"; [online at the internet:<URL: https://www.affective.com/]; [Last Visited Jun. 20, 2017].
Wikipedia, "Sentiment Analysis"; [online at the internet:<URL: https://en.wikipedia.org/wiki/Sentiment_analysis]; [Last Visited Jun. 20, 2017].
Lexalytics, "Sentiment Analysis"; [online at the internet:<URL: https://www.lexalytics.com/technology/sentiment]; [Last Visited Jun. 20, 2017].
Kristian Bannister, "Understanding Sentiment Analysis: What It Is & Why It's Used" published Jan. 26, 2015; [online at the internet: URL:<https://www.brandwatch.com/blog/understanding-sentiment-analysis/]; [Last Visited Jun. 20, 2017].
IBM Watson Developer Cloud, "Tone Analyzer"; [online at the internet:<URL: https://tone-analyzer-demo.mybluemix.net/]; [Last Visited Jun. 20, 2017].
Good Vibrations, "Emotion Recognition by Voice"; [online at the internet:<URL: http://www.good-vibrations.nl/]; [Last Visited Jun. 20, 2017].
Google Play, "Dual/Double Shot Camera 2sidez"; [online at the internet:<URL: https://play.google.com/store/apps/details?id=com.behind.the.camera&hl=en]; [Last Visited Jun. 20, 2017].
Google Play, "Dual Camera"; [online at the internet:<URL: https://play.google.com/store/apps/details?id=wik.dualcamera&hl=en]; [Last Visited Jun. 20, 2017].
Google Play, "Smart Front Back Dual Camera"; [online at the internet:<URL: https://play.google.com/store/apps/details?id=com.vkrun.double_camera&hl=en]; [Last Visited Jun. 20, 2017].
Google Play, "Dual Camera", [online at the internet:<URL: https://play.google.com/store/apps/details?id=com.dualcam&hl=en]; [Last Visited Jun. 20, 2017].
Vokaturi, "Vokaturi Emotion Recognition Software"; [online at the internet:<URL: https://vokaturi.com/]. [Last Visited Jun. 20, 2017].
Balazs Godeny, "The new dimensions of sentiment" published Feb. 7, 2014; [online at the internet:<URL: http://underthehood.meltwater.com/blog/2014/02/07/the-new-dimensions-of-sentiment/]. [Last Visited Jun. 20, 2017].
Pang, Bo, and Lillian Lee. "Opinion mining and sentiment analysis." Foundations and Trends® in Information Retrieval 2.1-2 (2008): 1-135.
Adam Helweh, "The Future of Sentiment Analysis" published Nov. 2, 2011; [online at the internet:<URL: http://socialmediaexplorer.com/content-sections/news-and-noise/sentiment-analysis/]. [Last Visited Jun. 20, 2017].
Maas, Andrew L., Andrew Y. Ng, and Christopher Potts, "Multi-dimensional sentiment analysis with learned representations", Technical report, 2011.
Gajarla, Vasavi, and Aditi Gupta. "Emotion Detection and Sentiment Analysis of Images," Georgia Institute of Technology (2015).
Nancy Lazarus, "Sentiment Analysis (Part 1): Tackling Visual Images and Facial Coding" published Jul. 20, 2015; [online at the internet:<URL: http://www.adweek.com/digital/sentiment-analysis-part-1-tackling-visual-images-and-facial-coding/]. [Last Visited Jun. 20, 2017].
Visual Sentiment Ontology; [online at the internet:<URL: http://visual-sentiment-ontology.appspot.com/]. [Last Visited Jun. 20, 2017].
Visual Sentiment Ontology, "Ontology: Emotional Mapping"; [online at the internet:<URL: http://visual-sentiment-ontology.appspot.com/show_emotional_mapping?selected_emotion=joy&page=1&display=none]. [Last Visited Jun. 20, 2017].

\* cited by examiner

IMAGE QUALITY EVALUATION

BACKGROUND

The present invention generally relates to photography, and more particularly to image quality evaluation.

Smart devices, such as smart phones and tablets may be equipped with a plurality of cameras. For example, users of smart devices may capture digital images of themselves, other individuals or objects in a surrounding environment. Thus, users of smart devices often capture relatively large number of images with varying degrees of subjective success. For example, captured images may be classified in user-created folders. Image content can be analyzed to classify by theme (e.g. family photos, scenery, etc.), or the images may be time and geography tagged. In addition, some information provided by viewers can be added, such as the "like" tags that have become common practice on social media.

The relatively large numbers of captured digital images may be stored on the smart devices or in an image database that may be accessible at a later time. Digital images that are captured and stored in such databases may include metadata. The metadata may include additional information about the captured digital images, such as a time or place that the digital image was captured. Metadata may include words or phrases associated with the images, or may be used to capture desired data that a user may wish to associate with a particular digital image. Thus, the metadata may be used as a way to identify one or more desired digital images for later search, retrieval and display to a user. For example, previously captured images may be captured by a user based on a particular search query, and thus a particular subset of images matching the search query may be displayed to a user.

SUMMARY

According to an exemplary embodiment of the present invention, a computer-implemented method of evaluating photographer satisfaction includes capturing a first digital image of a target object using a first digital camera of a smart device. A second digital image of a user of the smart device is captured using a second digital camera of the smart device. The second digital image includes an image of the user's facial expression. A satisfaction index is generated for the first digital image by analyzing the user's sentiment related to the first digital image. Analyzing the user's sentiment related to the first digital image includes evaluating the user's facial expression. The satisfaction index is then associated with the first digital image.

According to an exemplary embodiment of the present invention, a method of evaluating photographer satisfaction includes capturing a first digital image of a target object using a first digital camera of a smart device. A second digital image of a user of the smart device is captured using a second digital camera of the smart device. The second digital image includes an image of the user's facial expression. The method includes determining if there was an interaction between the user and the target object. A satisfaction index for the first digital image is generated by analyzing the user's sentiment related to the first digital image. Analyzing the user's sentiment related to the first digital image includes evaluating the user's facial expression. The satisfaction index is then associated with the first digital image.

According to an exemplary embodiment of the present invention, a computer program product includes a computer readable storage medium having program instructions embodied therewith. The program instructions are executable by a processor to cause the processor to capture a first digital image of a target object using a first digital camera of a smart device. The program instructions are executable by a processor to cause the processor to capture a second digital image of a user of the smart device using a second digital camera of the smart device. The second digital image includes an image of the user's facial expression. The program instructions are executable by a processor to cause the processor to generate a satisfaction index for the first digital image by analyzing the user's sentiment related to the first digital image. Analyzing the user's sentiment related to the first digital image includes evaluating the user's facial expression. The program instructions are executable by a processor to cause the processor to associate the satisfaction index with the first digital image.

BRIEF DESCRIPTION OF THE DRAWINGS

The above and other features of the present invention will become more apparent by describing in detail exemplary embodiments thereof, with reference to the accompanying drawings, in which.

DETAILED DESCRIPTION

Figure 1A:
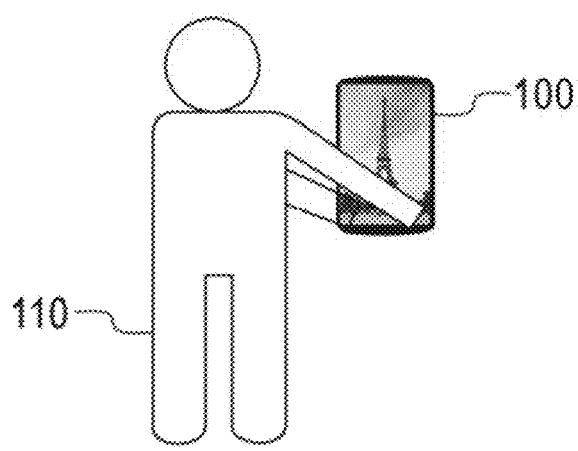
FIG. 1A illustrates a user of a smart device capturing an image according to an exemplary embodiment of the present invention.

It will be understood that the terms "first," "second," "third," etc. are used herein to distinguish one element from another, and the elements are not limited by these terms. Thus, a "first" element in an exemplary embodiment may be described as a "second" element in another exemplary embodiment.

Exemplary embodiments of the present invention will be described more fully hereinafter with reference to the accompanying drawings. Like reference numerals may refer to like elements throughout the specification and drawings.

The terms "photographer" and "user" may be used interchangeably herein. The terms "photograph," "photo," "image," and "digital image" may be used interchangeably herein.

Figure 1B:
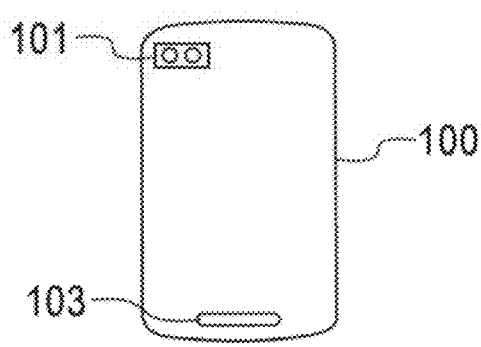
FIG. 1B illustrates a back side of a smart device including a first camera according to an exemplary embodiment of the present invention.
Figure 1C:
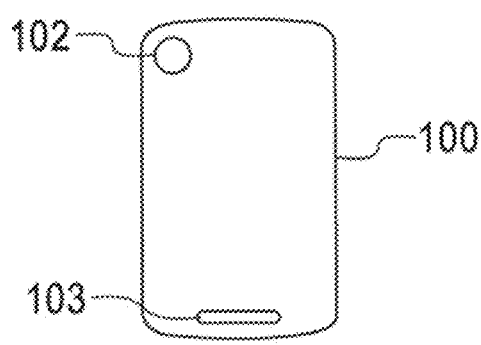
FIG. 1C illustrates a front side of a smart device including a second camera according to an exemplary embodiment of the present invention.
Figure 2:
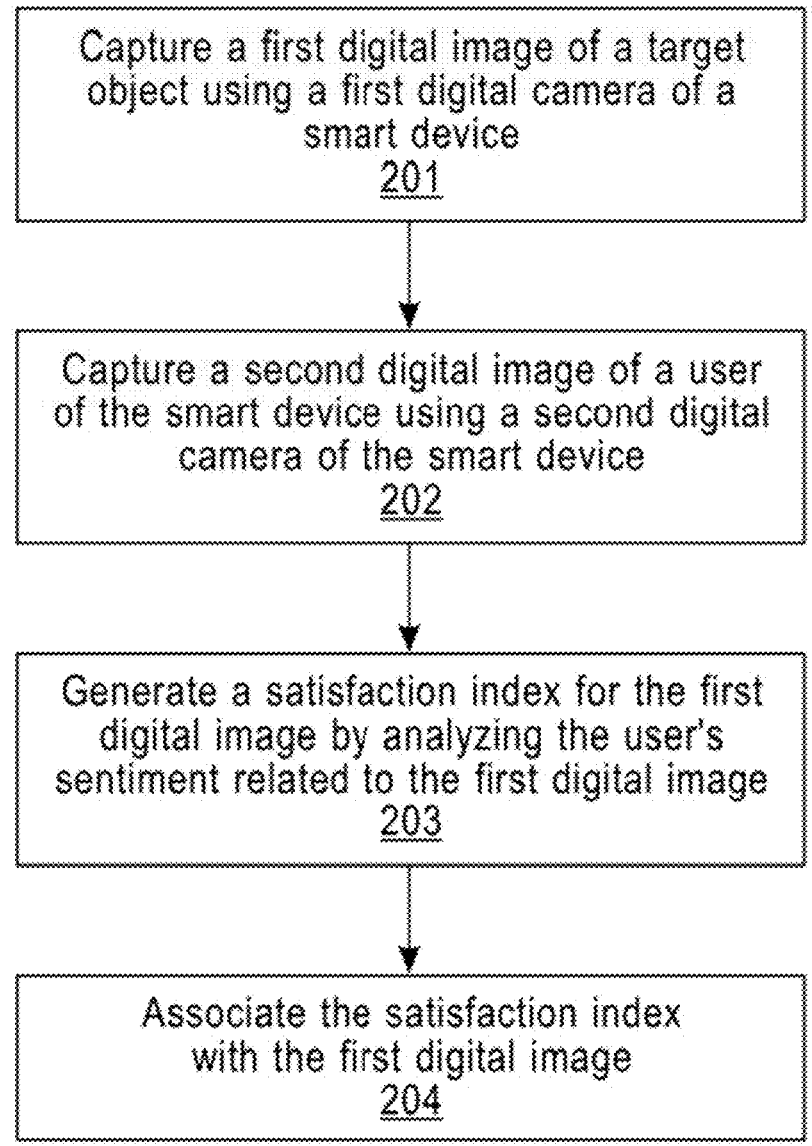
FIG. 2 illustrates a method of evaluating photographer satisfaction according to an exemplary embodiment of the present invention.
Figure 3:
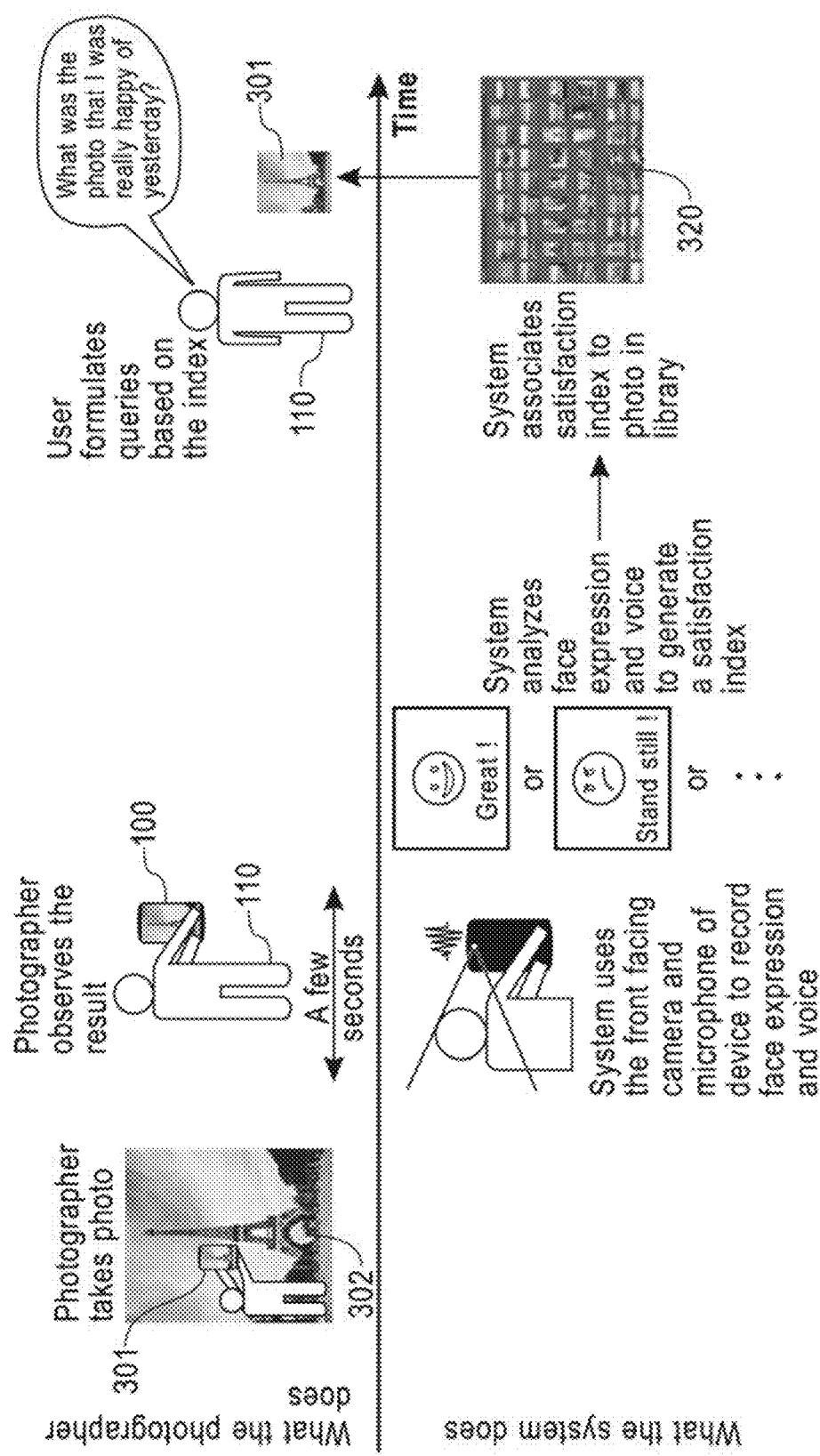
FIG. 3 illustrates a method of evaluating photographer satisfaction according to an exemplary embodiment of the present invention.
Figure 4:
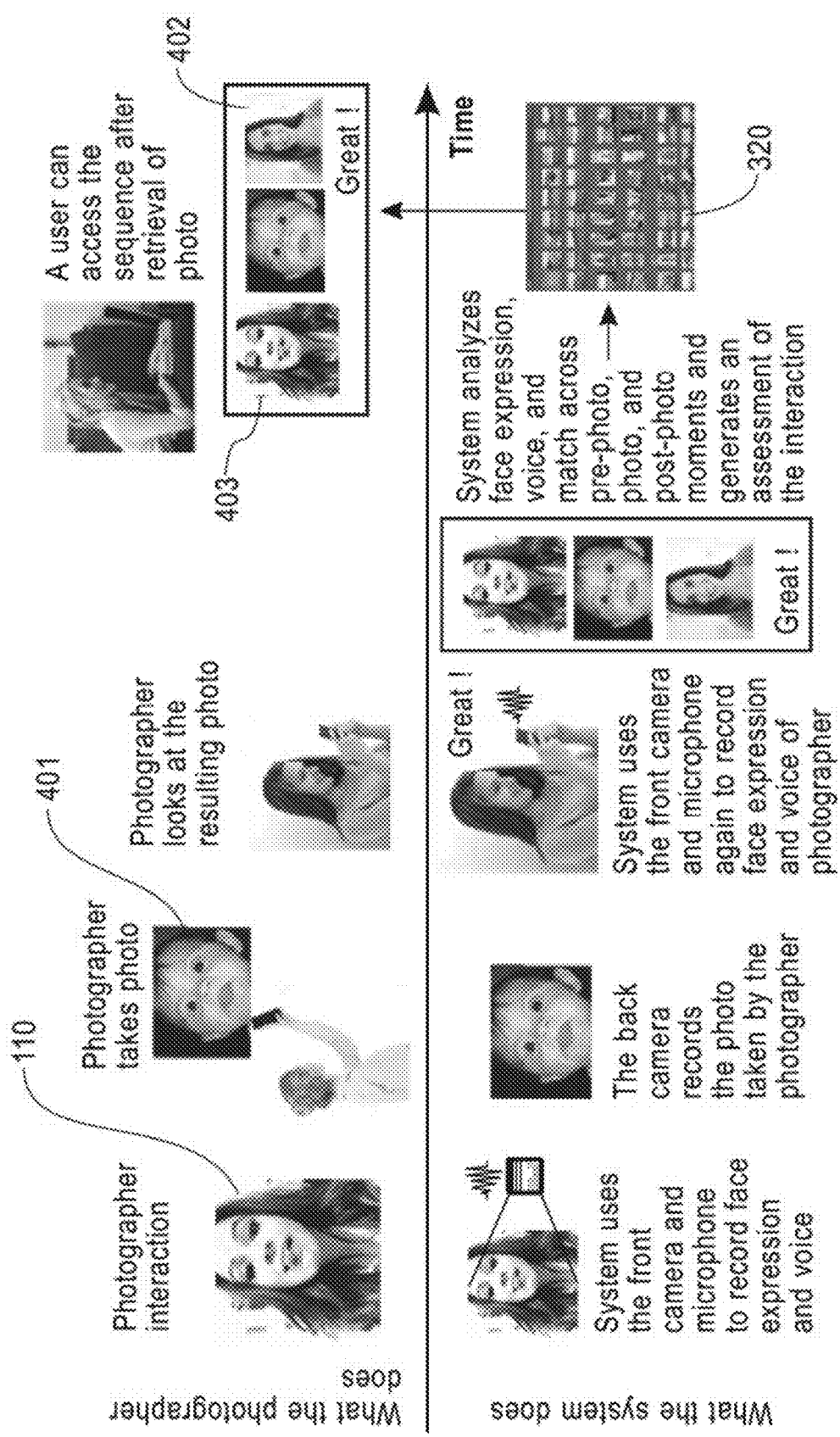
FIG. 4 illustrates a method of evaluating photographer satisfaction according to an exemplary embodiment of the present invention.

FIG. 1A illustrates a user of a smart device capturing an image according to an exemplary embodiment of the present invention. FIG. 1B illustrates a back side of a smart device including a first camera according to an exemplary embodiment of the present invention. FIG. 1C illustrates a front side of a smart device including a second camera according to an exemplary embodiment of the present invention. FIG. 2 illustrates a method of evaluating photographer satisfaction according to an exemplary embodiment of the present invention. FIG. 3 illustrates a method of evaluating photographer satisfaction according to an exemplary embodiment of the present invention. FIG. 4 illustrates a method of evaluating photographer satisfaction according to an exemplary embodiment of the present invention.

Referring to FIGS. 1A, 1B, 1C, 2, 3 and 4, a computer-implemented method of evaluating photographer satisfaction according to an exemplary embodiment of the present invention includes capturing a first digital image of a target object using a first digital camera of a smart device 201. A second digital image of a user of the smart device is captured using a second digital camera of the smart device 202. The second digital image includes an image of the user's facial expression. A satisfaction index is generated for the first digital image by analyzing the user's sentiment related to the first digital image 203. Analyzing the user's sentiment related to the first digital image includes evaluating the user's facial expression. The satisfaction index is then associated with the first digital image 204.

A first digital image 301 of a target object 302 may be captured using a first digital camera 101 of a smart device 100. A second digital image 403 of a user 110 may be captured using a second digital camera 102 of the smart device 100. The term "smart device," as used herein, may refer to a Smartphone, Tablet, Smart Glasses, Smart Watch, or any desired portable technology including a digital camera and carried on or about a user.

The smart device 100 may include a back side facing away from the user 110 (e.g., facing toward a target object— see, e.g., FIG. 1B) and a front side facing toward the user 110 (see, e.g., FIG. 1C). The first digital camera 101 may be positioned on the back side of the smart device 100 facing away from the user 110 and the second digital camera 102 may be positioned on the front side of the smart device 100 facing the user 110. The first digital camera 101 may be used to capture one or more first digital images 301 of a target object (e.g., target object 302), while the second digital camera may be used to capture one or more second digital images 403 of the user 110 taking the first digital image 301. Thus, as discussed below in more detail, the second digital image 403 may be used to assess the user's 110 satisfaction with the first digital image 301

According to an exemplary embodiment of the present invention, a target object (e.g., target object 302) may include another person or an object in an environment around the user 110.

According to an exemplary embodiment of the present invention, the method of evaluating photographer satisfaction may include capturing an audio recording of the user 110. The audio recording may be captured using of a second microphone 104 positioned on the front side of the smart device 100 facing the user 110. The smart device may also include a first microphone 103 positioned on the back side of the smart device 100 facing away from the user 110. The first microphone 103 may be used to capture an audio recording of the environment (e.g., emitted from people or objects) around the smart device 100. Capturing the audio recording of the user 110 may include recording the user's voice. The user's sentiment related to the first digital image 301 may be further analyzed using the audio recording of the user 110. Generation of a satisfaction index and analysis of a user's sentiment according to an exemplary embodiment of the present invention will be described below in more detail.

According to an exemplary embodiment of the present invention, the first digital image 301 and the second digital image 403 may be captured substantially simultaneously. For example, the second digital image 403 of the user 110 may be captured while the first digital image 301 is being captured.

According to an exemplary embodiment of the present invention, the user's facial expression may be captured as a video recorded for a first predetermined time period before capturing the first digital image 301 and for a second predetermined time period after capturing the first digital image 301. As an example, at least one of the first and second digital cameras 101 and 102 may be a video camera, or a camera equipped with both still image and video capture capabilities.

According to an exemplary embodiment of the present invention, the digital images captured by at least one of the first and second digital cameras 101 and 102 may be stored locally on a hard drive of the smart device 100. Alternatively, the digital images captured by at least one of the first and second digital cameras 101 and 102 may be stored remotely on a server (e.g., a cloud based server), which may be accessible through a network interface or a network antenna of the smart device 100. For example, the server may be accessible by WiFi, cell tower network connectivity or by Bluetooth connectivity of the smart device 100.

According to an exemplary embodiment of the present invention, the captured facial expressions and/or voice of the user 110 may generate a separate output file that may be associated with the first digital image 301.

FIG. 3 illustrates a method of evaluating photographer satisfaction according to an exemplary embodiment of the present invention.

Referring again to FIG. 3, according to an exemplary embodiment of the present invention, a method of evaluating photographer satisfaction includes capturing a first digital image 301 of a target object 302 using a first digital camera 101 of a smart device 100. A second digital image 403 of a user 110 of the smart device 100 is captured using a second digital camera 102 of the smart device 100. The second digital image 403 includes an image of the user's facial expression. The method includes determining if there was an interaction between the user 110 and the target object 302. A satisfaction index for the first digital image is generated by analyzing the user's sentiment related to the first digital image 301. Analyzing the user's sentiment related to the first digital image 301 includes evaluating the user's facial expression. The satisfaction index is then associated with the first digital image 301. Generation of a satisfaction index and analysis of a user's sentiment according to an exemplary embodiment of the present invention will be described below in more detail.

According to an exemplary embodiment of the present invention, determining if there was an interaction between the user 110 and a target object may include facial and voice expressions of the user 110 before, during and after capturing the first digital image 301 of the target object. For example, the user 110 may make silly faces at a child to encourage the child to smile before capturing the first digital image 301.

According to an exemplary embodiment of the present invention, the method of evaluating photographer satisfaction may include receiving a query for identifying at least one first digital image 301 of a plurality of first digital images. The query may include a request to retrieve an image based on a corresponding satisfaction index of the at least one first digital image 301 of the plurality of first digital images. The method of evaluating photographer satisfaction may include identifying at least one first digital image 301 of the plurality of first digital images based on the corresponding satisfaction index associated with the at least one first digital image 301 of the plurality of first digital images. For example, as described below in more detail, the first digital image may be stored in a photo library 320.

A photographer (e.g., user 110) may take at least one photograph of a target object 302 and may then observe the resulting photograph. Observing the photograph may be done immediately following capturing the photograph (e.g., within a few seconds). A system implementing the methods according to an exemplary embodiment of the present invention may use the front facing camera of a smart device used to capture the image to record a facial expression and/or the voice of the user while the photograph is observed by the user. The user may express a relative degree of satisfaction with the captured image, such as by making a positive (e.g., smiling) or negative (e.g., frowning) facial expression while viewing the image. The system may analyze the facial expression and/or voice of the user to generate a satisfaction index. The satisfaction index may be associated with the corresponding digital image (e.g., as metadata). Thus, the first digital image 301 may be searchable and may be identified based on a satisfaction index score applied to the first image 301.

As an example, user satisfaction may be stated explicitly, such as by making an explicit declarative statement such as "this photo is great" or "I do not like this photo." This explicit statement may be associated with the corresponding digital image (e.g., as metadata).

As an example, the satisfaction index may include a scale from 0 to 100, in which a score of "0" indicates the user 110 is not satisfied with the first image 301 at all, and a score of "100" indicates complete satisfaction with an image. Thus, the satisfaction index score may be determined based on a spectrum of satisfaction from 0-100. As an example, a completely satisfied expression may be a smile displayed by the user 110, while an expression indicating the user 110 is not satisfied at all may be expressed as a frown. Additionally, a user 110 may make an overt statement indicating a level of satisfaction (e.g., an utterance of "I am completely satisfied with this image"), an overt statement of dissatisfaction (e.g., "I am completely dissatisfied with this image"), or a more moderate statement of satisfaction (e.g., "I am equally satisfied with some aspects of this image and dissatisfied with some other aspects of this image"), which may be recorded by the second microphone 104 of the smart device 100. As discussed herein, the facial expression and/or the voice recording of the user 110 may generate a separate output file, and/or may be stored as metadata associated with the first digital image 301. Each image including the metadata, and/or the separate output file may be stored in the photo library 320, as described herein.

The user 110 may formulate a query based on a satisfaction index score of a particular first digital image 301. For example, the query may include a request to retrieved images having a particular satisfaction index score (e.g., a score of 90 or greater). However, exemplary embodiments of the present invention are not limited to a particular search query, and any query may be formulated by a user, as desired. Thus, an image having a satisfaction index score matching the query may be identified (e.g., from the photo library 320).

According to an exemplary method of the present invention, the computer-implemented method may include receiving a query for identifying at least one first digital image 301 of a plurality of first digital images. The query may include a request to retrieve an image based on a corresponding satisfaction index of the at least one first digital image 301 of the plurality of first digital images. The query may include a request to retrieve the image based on an identified interaction between the user 110 and the target object. The computer-implemented method may include identifying at least one first digital image 301 of the plurality of first digital images based on the corresponding satisfaction index associated with the at least one first digital image 301 of the plurality of first digital images, and based on the identified interaction between the user and the target object.

FIG. 4 illustrates a method of evaluating photographer satisfaction according to an exemplary embodiment of the present invention. The features described above with reference to FIGS. 1A, 1B, 1C, 2 and 3 are similarly available in the exemplary embodiment described below with reference to FIG. 4, and thus duplicative descriptions may be omitted below.

Referring again to FIG. 4, a method of evaluating photographer satisfaction according to an exemplary embodiment of the present invention may include determining if there was an interaction between the user 110 and the target object. The target object may be another person in the environment around the user. Thus, a first digital image 401 may be captured of a second person, and the user 110 may interact with the second person prior to capturing the first digital image 401. For example, the second person may be a child, and the user 110 may interact with the child by making a silly face to encourage the child to smile, prior to capturing the first digital image 401 of the child. A third digital image 403 (which may be a video recording, as described above) of the user 110 may be captured and used to determine if the user 110 interacted with the target object (e.g., child) prior to capturing the first digital image 110 of the child. A second digital image 402 may be captured of the user 110 during and/or after the capturing of the first digital image 401, as described above in more detail.

According to an exemplary embodiment of the present invention, a photographer interaction with a target object may be captured as the third digital image 403. The photographer may take a photograph of the target object (e.g., the first digital image 401) after interacting with the target object. After capturing the first digital image 401 of the target object, the photographer may look at the resulting photograph and make facial expression and/or voice a response to the first digital image 401. The photographer's facial expression reaction may be captured as the second digital image 402. The photographer's voice may additionally be captured, which may include a statement of satisfaction. The statement of satisfaction may be an explicit statement of satisfaction or an implicit statement of satisfaction.

According to an exemplary embodiment of the present invention, each of the first, second and third digital images 401, 402 and 403 may be stored in and retrieved from a photo library 420. Additionally, when retrieved, each of the first, second and third digital images 401, 402 and 403 may be displayed in the sequence in which they were captured. Thus, a user 110 may be submit a query including a request to retrieve photographs in which the user 110 interacted with the target object, and in which the user displayed a particular satisfaction index score.

A system according to an exemplary embodiment of the present invention may use the front camera (e.g., the camera 102) and microphone (e.g., the second microphone 104) of the smart device (e.g., smart device 110) to record a facial expression and voice of the photographer. The back camera (e.g., the camera 101) of the smart device may record a photo (e.g., the first digital image 401) taken by the photographer. The system may use the front camera and the microphone of the smart device to record the facial expression and/or voice of the photographer. The system may analyze the facial expression and voice to match captured images and voice across pre-photo, photo and post-photo moments. Thus, the system may generate an assessment of the interactions between the photographer and the target object, and a reaction of the photographer to the captured photograph to determine a satisfaction index score for the first digital image 401.

Generation of a satisfaction index, and analysis of user sentiment (e.g., sentiment analysis) according to an exemplary embodiment of the present invention, will be described below in more detail.

According to an exemplary embodiment of the present invention, the satisfaction index score for a captured digital image may include evaluating the captured image using sentiment analysis.

Sentiment analysis, which may also be referred to as opinion mining or emotion artificial intelligence (emotional AI), refers to the use of natural language processing, text analysis, computational linguistics, and biometrics to systematically identify, extract, quantify, and study affective states and subjective information. Sentiment analysis may be applied to analyze a captured image (e.g., a captured digital image) and/or captured voice recording.

Sentiment analysis may include one or more of a number of approaches, such as, for example, knowledge-based techniques, statistical methods, and hybrid approaches.

Knowledge-based techniques can classify text by affect categories based on the presence of unambiguous affect words such as happy, sad, afraid, and bored. A knowledge base may be used to list obvious affect words (e.g., happy), but may also be used to assign arbitrary words a probable "affinity" to particular emotions.

Statistical methods leverage may utilize machine learning such as latent semantic analysis, support vector machines, "bag of words" and Semantic Orientation. To mine a particular opinion in context and get the feature which has been opinionated, the grammatical relationships between words may be employed. Grammatical dependency relations may be obtained by deep parsing of the text.

Hybrid approaches leverage on both machine learning and elements from knowledge representation such as ontologies and semantic networks. Hybrid approaches may detect semantics that are expressed in a relatively subtle manner (e.g., through the analysis of concepts that do not explicitly convey relevant information, but which are implicitly linked to other concepts that do so).

The state of the art for sentiment analysis includes concepts that can be used to define what a satisfaction index can really be. Specifically, this index can be multi-dimensional and include finer definitions of satisfaction that go beyond the simple "good/not-good" or "like/dislike" dichotomies.

The above-described techniques are usable for text and language analysis, but are similarly applicable to image and/or video analysis (e.g., of facial expressions). For example, visual sentiment ontologies for emotional mapping that can be used to establish the satisfaction index. Visual content such as images and videos may include objects, locations and actions but may also include cues about affect, emotion and sentiment. Cues about affect, emotion and sentiment are useful to understand visual content beyond semantic concept presence thus making it more explainable to the user. As an example, emotional mapping may be employed to identify and evaluate emotions expressed in a digital image.

As an example, the photographer may purposefully express his/her satisfaction or dissatisfaction by adopting a specific face expression and this content may be captured by the front camera (e.g., the digital camera 102) and the microphone (e.g., the second microphone 104) of the smart device (e.g., the smart device 100) and later analyzed. For example, in order to submit a negative appreciation of a restaurant in a smart device application or through a website, a user of a Smartphone while voicing a negative comment such as "service was not satisfactory." The negative comment would then be submitted to the website as of the restaurant that can be determined from the geographic location of the device at the time of the action.

According to an exemplary embodiment of the present invention, the satisfaction index may be associated with the first digital image 301 as metadata of the first digital image.

Figure 5:
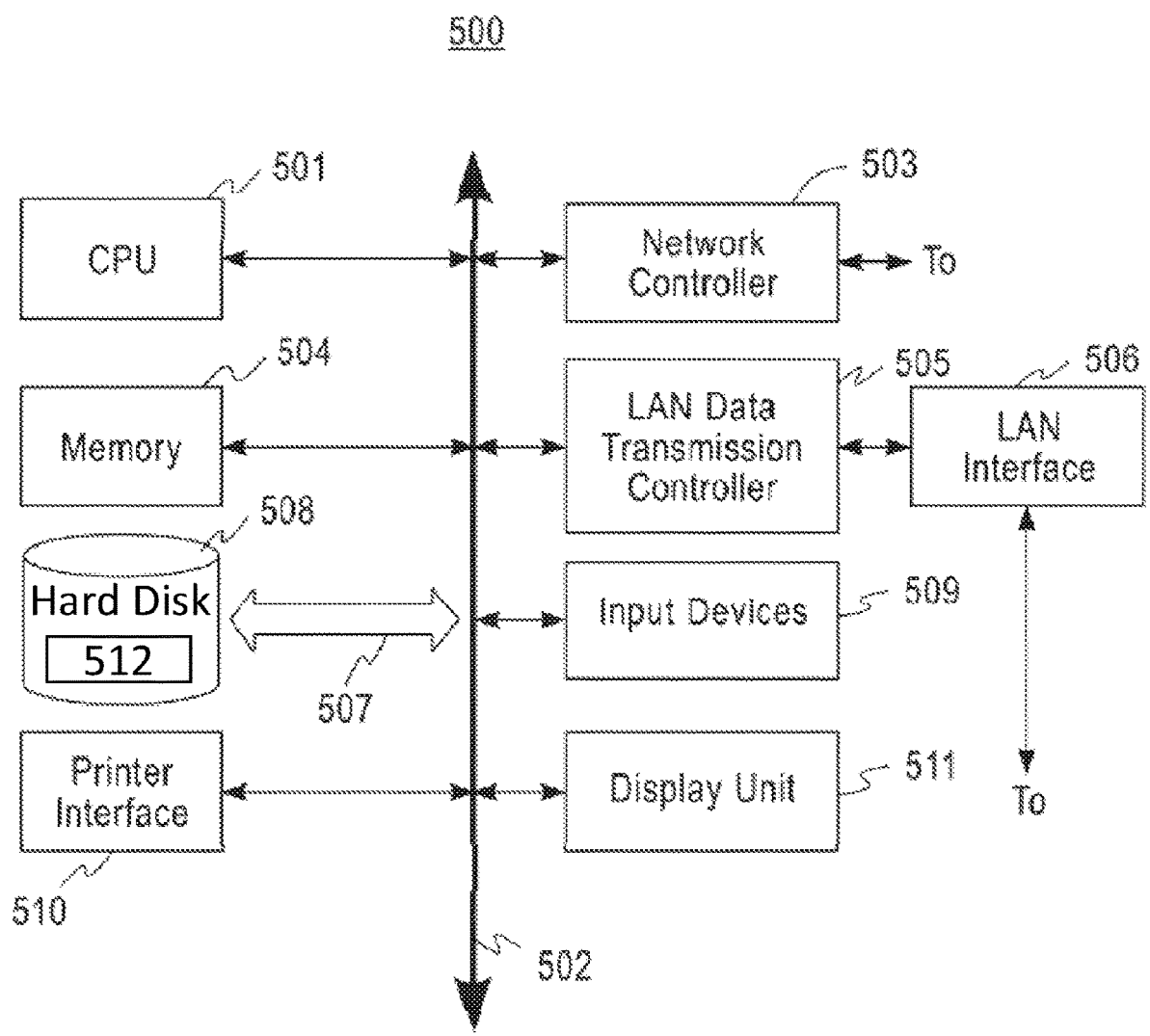
FIG. 5 illustrates an example of a computer system capable of implementing the methods according to exemplary embodiments of the present invention.

FIG. 5 illustrates an example of a computer system capable of implementing the methods according to exemplary embodiments of the present invention. The system and method of the present disclosure may be implemented in the form of a software application running on a computer system, for example, a mainframe, personal computer (PC), handheld computer, server, etc. The software application may be stored on a recording media locally accessible by the computer system and accessible via a hard wired or wireless connection to a network, for example, a local area network, or the Internet.

The computer system referred to generally as system 500 may include, for example, a central processing unit (CPU) 501, random access memory (RAM) 504, a printer interface 510, a display unit 511, a local area network (LAN) data transmission controller 505, a LAN interface 506, a network controller 503, an internal bus 502, and one or more input devices 509, for example, a keyboard, mouse etc. As shown, the system 500 may be connected to a data storage device, for example, a hard disk, 508 via a link 507.

According to an exemplary embodiment of the present invention, a computer program product 512 includes a computer readable storage medium having program instructions embodied therewith. The program instructions are executable by a processor (e.g., processor 501) to cause the processor to capture a first digital image 301 of a target object 302 using a first digital camera 101 of a smart device 100. The program instructions are executable by a processor to cause the processor to capture a second digital image 403 of a user 110 of the smart device 100 using a second digital camera 102 of the smart device 100. The second digital image 403 includes an image of the user's facial expression (see, e.g., FIGS. 3 and 4, described in more detail above). The program instructions are executable by a processor to cause the processor to generate a satisfaction index for the first digital image 301 by analyzing the user's sentiment related to the first digital image 301. Analyzing the user's sentiment related to the first digital 301 image includes evaluating the user's facial expression. The program instructions are executable by a processor to cause the processor to associate the satisfaction index with the first digital image 301.

The descriptions of the various exemplary embodiments of the present invention have been presented for purposes of illustration, but are not intended to be exhaustive or limited to the exemplary embodiments disclosed. Many modifications and variations will be apparent to those of ordinary skill in the art without departing from the scope and spirit of the described exemplary embodiments. The terminology used herein was chosen to best explain the principles of the exemplary embodiments, or to enable others of ordinary skill in the art to understand exemplary embodiments described herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and/or block diagrams in the figures illustrate the architecture, functionality, and operation of possible implementations of systems, methods, and computer program products according to various exemplary embodiments of the invention. In this regard, each block in the flowchart or block diagrams may represent a module, segment, or portion of instructions, which comprises one or more executable instructions for implementing the specified logical function(s). In alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Exemplary Image Capture Scenarios

An exemplary photo shooting scenario may include the following. First the photographer aims at the target either by putting his/her eye in the viewfinder or looking at the front screen of the device (e.g. a smart device described above in more detail). The photographer then shoots the photo. Typically, the photographer then immediately looks at the result in the front screen of the device, assesses the adequacy or quality of the resulting image, and takes action (e.g. move on, or re-shoot the photo).

In both scenarios below, photographs and voice of the photographer are captured through the front camera of the smart device and its microphone just before and/or after the photographer shoots the photos. The resulting analysis can be stored with the photo, together with the extra photos and sounds captured, as described herein.

Exemplary Scenario 1:

Photographs or video images are captured for the few seconds that follow the photo shooting, once the resulting photo is shown in the screen of the device. Typically, this would result in a series of images or a video of the photographer and of the photographer's comments at their own photo. Analyzing this material in turn leads to an understanding of what the photographer thinks of the photo. For example, attitudes face expressions, and oral comments can be derived, and classified as belonging to categories such as, for example, dislike, satisfaction, worry, or joy. This information can in turn be used to calculate the "satisfaction index" and/or emotion classification for the photo that will be stored with the photo for subsequent queries. This exemplary scenario could also capture the surrounding sound of acceptance or not if many persons are around in the photo.

One possible application consists in associating this information to a broader context—which can be derived from the classifications described in more detail above—so as to rank the photo among others. The photographer may want to first look at photos that have the highest satisfaction assessment from the photographer (e.g., especially if the viewer and the photographer happen to be the same person). For example, a person may ask: "what were the photos among the many that I shot at a given family reunion that I was the most satisfied with?"

Exemplary Scenario 2:

In an exemplary photo shooting scenario it is possible to automatically recognize, analyze and register the interplay among people in a particular moment of photo shooting, in which the photographer wants to create empathy or tease a certain reaction from the persons in the photo.

The following method can then be applied:

First, when the photographer decides to press the shooter button, a photo of his face from the front camera is automatically taken and his voice is recorded, a relatively short time (e.g. two seconds) before the back camera is actually activated to take the photo. This image and sound are analyzed for their emotional content and/or identification of special content, as for example making a silly face to a child or smiling while shouting "cheese" to a group.

Second, the result of this analysis is then compared to the analysis of the content of the photo itself once it has been taken. For example, did the whole group actually smile, or did the child laughed at the silly face? The result of the comparison serves as a good assessment of the quality of interaction photographer/subjects.

Third, as described in more detail above, the reaction of the photographer is captured through another photo and a voice recording, which are analyzed to evaluate if a photo capturing goal was reached.

Fourth, in case of a successful interaction the storage of the moments before, during and after a photograph is captured and a condensed video of a few seconds with additional information attached as potential query tags is generated. This creates the potential to aggregate all these moments: the photographer before, the photo itself and the photographer evaluating the resulting photo.

While the present invention has been particularly shown and described with reference to exemplary embodiments thereof, it will be understood by those of ordinary skill in the art that various changes in form and detail may be made therein without departing from the spirit and scope of the present invention as defined by the following claims.

The invention claimed is:

1. A computer-implemented method of evaluating a quality level of a first digital image of a target object, comprising:
   generating the first digital image of the target object using a first digital camera of a smart device;
   generating a second digital image of a user of the smart device using a second digital camera of the smart device, wherein the second digital image is generated after the generation of the first digital image and includes an image of the user's facial expression when viewing the generated first digital image;
   generating a third digital image of the user using the second digital camera of the smart device, wherein the third digital image is generated prior to generating the first digital image;
   generating an assessment of an interaction between the user and the target object by analyzing the first digital image, the second digital image and the third digital image;
   generating a quality index for the first digital image by analyzing the user's sentiment related to the first digital image, wherein analyzing the user's sentiment related to the first digital image includes evaluating the user's facial expression in the second digital image; and
   associating the quality index with the first digital image to provide a quality level for the first digital image.

2. The computer-implemented method of claim 1, further comprising capturing an audio recording of the user, wherein capturing the audio recording of the user comprises recording the user's voice, and wherein the user's sentiment related to the first digital image is further analyzed using the audio recording of the user.

3. The computer-implemented method of claim 1, wherein the quality index is associated with the first digital image as metadata of the first digital image.

4. The computer-implemented method of claim 1, wherein the user's facial expression is captured as a video recorded for a first predetermined time period before capturing the first digital image and for a second predetermined time period after capturing the first digital image.

5. The computer-implemented method of claim 1, further comprising:
   receiving a query for identifying at least one first digital image of a plurality of first digital images, wherein the query includes a request to retrieve an image based on a corresponding quality index of the at least one first digital image of the plurality of first digital images; and
   identifying at least one first digital image of the plurality of first digital images based on the corresponding quality index associated with the at least one first digital image of the plurality of first digital images.

6. A method of evaluating a quality level of a first digital image of a target object, comprising:
generating the first digital image of the target object using a first digital camera of a smart device;
generating a second digital image of a user of the smart device using a second digital camera of the smart device, wherein the second digital image is generated after the generation of the first digital image and includes an image of the user's facial expression when viewing the generated first digital image;
generating a third digital image of the user using the second digital camera of the smart device, wherein the third digital image is generated prior to generating the first digital image;
determining if there was an interaction between the user and the target object by analyzing the first digital image, the second digital image and the third digital image;
generating a quality index for the first digital image by analyzing the user's sentiment related to the first digital image, wherein analyzing the user's sentiment related to the first digital image includes evaluating the user's facial expression in the second digital image; and
associating the quality index with the first digital image to provide a quality level for the first digital image.

7. The method of claim 6, further comprising capturing an audio recording of the user, wherein capturing the audio recording of the user comprises recording the user's voice, and wherein the user's sentiment related to the first digital image is further analyzed using the audio recording of the user.

8. The method of claim 6, wherein the user's facial expression is captured as a video recorded for a first predetermined time period before capturing the first digital image and for a second predetermined time period after capturing the first digital image.

9. The method of claim 8, further comprising:
receiving a query for identifying at least one first digital image of a plurality of first digital images, wherein the query includes a request to retrieve an image based on a corresponding quality index of the at least one first digital image of the plurality of first digital images, and wherein the query includes a request to retrieve the image based on an identified interaction between the user and the target object; and
identifying at least one first digital image of the plurality of first digital images based on the corresponding quality index associated with the at least one first digital image of the plurality of first digital images, and based on the identified interaction between the user and the target object.

10. The method of claim 9, further comprising displaying the identified at least one first digital image to the user.

11. A non-transitory computer program product comprising a computer readable storage medium having program instructions embodied therewith, the program instructions executable by a processor to cause the processor to:
generate a first digital image of a target object using a first digital camera of a smart device;
generate a second digital image of a user of the smart device using a second digital camera of the smart device, wherein the second digital image is generated after the generation of the first digital image and includes an image of the user's facial expression when viewing the generated first digital image;
generate a third digital image of the user using the second digital camera of the smart device, wherein the third digital image is generated prior to generating the first digital image;
generate an assessment of an interaction between the user and the target object by analyzing the first digital image, the second digital image and the third digital image;
generate a quality index for the first digital image by analyzing the user's sentiment related to the first digital image, wherein analyzing the user's sentiment related to the first digital image includes evaluating the user's facial expression in the second digital image; and
associate the quality index with the first digital image.

12. The computer program product of claim 11, further comprising causing the processor to capture an audio recording of the user, wherein capturing the audio recording of the user comprises recording the user's voice, and wherein the user's sentiment related to the first digital image is further analyzed using the audio recording of the user.

13. The computer program product of claim 11, wherein the quality index is associated with the first digital image as metadata of the first digital image.

14. The computer program product of claim 11, wherein the user's facial expression is captured as a video recorded for a first predetermined time period before capturing the first digital image and for a second predetermined time period after capturing the first digital image.

15. The computer-implemented method of claim 11, further comprising causing the processor to:
receive a query for identifying at least one first digital image of a plurality of first digital images, wherein the query includes a request to retrieve an image based on a corresponding quality index of the at least one first digital image of the plurality of first digital images; and
identify at least one first digital image of the plurality of first digital images based on the corresponding quality index associated with the at least one first digital image of the plurality of first digital images.

* * * * *